United States Patent
Garrison et al.

(10) Patent No.: US 7,423,098 B2
(45) Date of Patent: Sep. 9, 2008

(54) POLYETHYLENE PROCESS

(75) Inventors: Philip J. Garrison, Houston, TX (US); Charles S. Holland, Coal City, IL (US); Mark P. Mack, West Chester, OH (US); Linda N. Winslow, Cincinnati, OH (US); Everett O. Lewis, Lake Jackson, TX (US); James R. Clark, Kingwood, TX (US); Leonard V. Cribbs, Hamilton, OH (US); Bradley P. Etherton, Cincinnati, OH (US); Jean A. Merrick-Mack, West Chester, OH (US); Paula L. Nygard, Bay City, TX (US)

(73) Assignee: Equistar Chemicals, LP, Houston, TX (US)

( * ) Notice: Subject to any disclaimer, the term of this patent is extended or adjusted under 35 U.S.C. 154(b) by 259 days.

(21) Appl. No.: 11/333,576

(22) Filed: Jan. 17, 2006

(65) Prior Publication Data

US 2007/0167585 A1 Jul. 19, 2007

(51) Int. Cl.
*C08F 4/6192* (2006.01)
*C08F 4/6592* (2006.01)
*C08F 210/14* (2006.01)
*C08F 210/16* (2006.01)

(52) U.S. Cl. ............... 526/65; 526/160; 526/161; 526/172; 526/905; 525/53; 525/191; 525/240

(58) Field of Classification Search ............ 525/53, 525/191, 240; 526/65, 160, 161, 172, 905
See application file for complete search history.

(56) References Cited

U.S. PATENT DOCUMENTS

| 4,357,448 | A | 11/1982 | Tsubaki et al. ............. 526/65 |
| 6,211,311 | B1 | 4/2001 | Wang et al. ............... 526/131 |
| 6,232,260 | B1 | 5/2001 | Nagy et al. ............... 502/155 |
| 6,323,149 | B1 | 11/2001 | Takemori et al. ............ 502/114 |
| 6,451,724 | B1 | 9/2002 | Nifant'ev et al. ........... 502/103 |
| 6,486,270 | B1 | 11/2002 | Garrison et al. ............. 526/65 |
| 6,552,150 | B1 | 4/2003 | Nummila-Pakarinen et al. ............. 526/352 |
| 6,559,251 | B1 | 5/2003 | Wang et al. ............... 526/127 |
| 6,566,450 | B2 | 5/2003 | Debras et al. ............. 525/191 |
| 6,693,155 | B1 | 2/2004 | Meverden et al. ........... 526/160 |
| 6,759,361 | B2 | 7/2004 | Lynch et al. ............. 502/102 |
| 6,794,468 | B1 | 9/2004 | Wang ...................... 526/161 |
| 6,818,713 | B1 | 11/2004 | Wang et al. ............... 526/161 |
| 6,838,410 | B2 | 1/2005 | Wang et al. ............... 502/103 |
| 2001/0014724 | A1 | 8/2001 | Promel et al. ............... 526/65 |
| 2002/0065368 | A1 * | 5/2002 | Debras et al. ............. 525/191 |
| 2004/0192861 | A1 | 9/2004 | Mutchler et al. ............ 526/65 |

FOREIGN PATENT DOCUMENTS

| EP | 1 195 388 | 10/2000 |
| GB | 2 051 833 | 1/1981 |
| WO | WO 99/24446 | 5/1999 |
| WO | WO 01/53360 | 7/2001 |

OTHER PUBLICATIONS

Jüngling et al., *J. Organometal, Chem.* 460 (1993) 191.
Noh et al., *J. Organometal. Chem.* 518 (1996) 1.
Noh et al., *J. Organometal. Chem.* 580 (1999) 90.

* cited by examiner

*Primary Examiner*—Roberto Rábago
(74) *Attorney, Agent, or Firm*—John Tyrell; Jonathan L. Schuschardt

(57) ABSTRACT

An ethylene polymerization process is disclosed. Ethylene is polymerized in two slurry reaction zones with a $C_6$-$C_{10}$ alpha-olefin in the presence of a single-site catalyst capable of making a high molecular weight polyolefin. The process yields medium density and linear low density polyethylene having a bimodal molecular weight distribution and a melt index from about 0.10 to about 0.80. Films from the polyethylene have superior impact properties.

11 Claims, No Drawings

POLYETHYLENE PROCESS

FIELD OF THE INVENTION

The invention relates to a multi-zone slurry process for polymerizing ethylene with a $C_6$-$C_{10}$ alpha-olefin. The process gives polyethylene with good film properties.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they often produce polymers with improved physical properties. However, in the production of linear low density polyethylene for film applications, especially in slurry processes, Ziegler-Natta catalysts predominate. One reason is that it has been difficult to use single-site catalysts to produce polyethylene with good film properties. While comonomer incorporation is usually good, the polyethylene often has poor impact properties or processes poorly because of its narrow molecular weight distribution.

Organometallic complexes that incorporate "indenoindolyl" ligands are known (see U.S. Pat. Nos. 6,232,260, 6,451,724, and 6,559,251 and PCT Int. Appl. WO 01/53360). In many of the known complexes, an indenoindolyl group is bridged to another group, which may be a second indenoindolyl group. The ligands are versatile because a wide variety of indanone and arylhydrazine precursors can be used to produce indenoindoles. Thus, substituent effects can be exploited and catalyst structure can be altered to produce polyolefins having a desirable balance of physical and mechanical properties. However, they have not been used in two slurry reaction zones to produce medium density or linear low density polyethylenes that provides good film properties.

Single-site catalysts containing an aryl group bonded to a Group 4 transition metal through an oxygen or sulfur atom used with an organoaluminum compound such as methyl alumoxane or a cation generator are disclosed in U.S. Pat. No. 6,323,149. The transition metal compound or the organoaluminum compound or both may be deposited on a support for use. These catalysts have not been used in two slurry reaction zones to produce medium density or linear low density polyethylenes with good film properties.

Multi-zone slurry polymerizations of ethylene with Ziegler-Natta catalysts are known. For example, U.S. Pat. No 4,357,448 discloses a two-step process for polymerizing ethylene in the presence of a Ziegler-Natta catalyst in combination with a reaction product of a titanium or vanadium halogen-containing compound with a first reaction product of a Grignard reagent with a hydropolysiloxane. A small amount of a second alpha-olefin is optionally used and the lowest reported density is 0.9515. The reference does not teach how to make medium density or linear low density polyethylenes with good film properties.

U.S. Pat. No. 6,486,270 discloses a process to polymerize ethylene with a $C_3$-$C_{10}$ alpha-olefin in the presence of high levels of hydrogen to make polyethylene with a density of from about 0.92 to about 0.94 g/cm³ with multiple reaction zones using a Ziegler-Natta catalyst. The polyethylene has improved film properties versus high-density polyethylene, but the film properties are insufficient for many applications. For example, when the polyethylene is blown "in-the-pocket" into a film having a thickness of 13 microns, the dart drop impact strength is less than about 50 grams (see Comparative Example 12, below).

There has been some use of single-site catalysts in two reaction zones. U.S. Pat. No. 6,566,450 discloses a process using bis-indenyl single-site catalysts to produce polyethylene with a bimodal molecular weight distribution having a density of from 0.95 to 0.96 g/cm³ useful as pipe resin. Not taught is how to make medium density or linear low density polyethylene with good film properties.

U.S. Pat. No. 6,552,150 discloses a process which polymerizes ethylene in two reaction zones to give polyethylene with a density of 0.929 to 0.934 g/cm³ and good film properties. A Ziegler-Natta catalyst is preferred. The preferred process is a slurry loop reactor followed by a gas phase reactor. While this process gives polyethylene with good properties, it would be desirable to produce polyethylene in an all-slurry process. A combination slurry and gas-phase process adds to complexity and cost. The reference teaches that "while it may be possible to use a process comprising cascaded slurry reactors only, such a process is not recommended, due to problems which may occur when a component having a low density is dissolved in the reaction diluent."

Heretofore, it has been difficult to achieve low densities with Ziegler-Natta catalysts in two reaction zones in a slurry process. Because of poor comonomer incorporation, waxes build up and can foul the reactor. Single-site catalysts are known to give improved comonomer incorporation, but they often cannot achieve the required molecular weight due to competing chain termination reactions and decompositions which produce hydrogen. The resultant polyethylene has inferior film properties. In sum, there is a continuing need for an all-slurry process that can provide medium density or linear low density polyethylenes that give films with improved properties, especially impact strength and impact resistance.

SUMMARY OF THE INVENTION

The invention is a process for preparing medium density and linear low density polyethylene having a bimodal molecular weight distribution and a melt index from about 0.10 to about 0.80 dg/min. The polyethylene, which is made by a slurry polymerization of ethylene with a $C_6$-$C_{10}$ α-olefin in two reaction zones in the presence of a supported transition metal complex, provides films with excellent impact strength and impact resistance.

DETAILED DESCRIPTION OF THE INVENTION

The invention is a process which comprises polymerizing ethylene with a $C_6$-$C_{10}$ alpha-olefin. Lower alpha-olefins such as 1-butene give inferior film properties. Suitable $C_6$-$C_{10}$ alpha-olefins include 1-hexene, 1-octene, and mixtures thereof. Preferably, the alpha-olefin is 1-octene. The polymerization is a slurry process and is conducted in at least two reaction zones. Preferably, greater than 50% by weight of the total $C_6$-$C_{10}$ alpha-olefin is added to the second reactor zone; more preferably, greater than 80% by weight is added.

From about 35 to about 75 wt. % of the polymer is produced in a first reaction zone with a hydrogen to ethylene molar ratio in the vapor phase of from about 0.00005:1 to about 0.01:1 to produce a first-zone material having a melt index of from about 1 to about 300 dg/min. This material is transferred as a slurry to a second reaction zone having a hydrogen to ethylene molar ratio in the vapor phase of from about 0.000001:1 to about 0.003:1. The product is polyethylene with a bimodal molecular weight distribution, a density of from about 0.91 to about 0.94 g/cm³, and a melt index of from about 0.10 to about 0.80 dg/min. Preferably, the polyethylene has a density of from about 0.915 to about 0.925 g/cm$^3$, more preferably from 0.920 to 0.925 g/cm$^3$. Preferably, each reaction zone is operated at a temperature from about 60° C. to about 100° C.

The slurry reaction zones preferably include an inert solvent. Useful solvents include saturated aliphatic and aromatic hydrocarbons. Saturated aliphatic hydrocarbons are preferred. Preferably, the solvent has a boiling point at atmospheric pressure in the range of about 30° C. to about 150° C. Solvents of lower boiling points are difficult to handle and can create high pressure in the reaction zone. Higher-boiling solvents can be difficult to remove at the end of the process. Suitable solvents include pentane, hexane, heptane, octane, toluene, xylene, and cyclohexane and mixtures of solvents such as Isopar®G solvent (product of ExxonMobil Corporation).

Hydrogen is used to control the molecular weight in both reaction zones. The amount of hydrogen needed depends upon the desired polyolefin molecular weight and melt flow properties. Generally, as the amount of hydrogen is increased, the polyolefin molecular weight decreases and the melt flow rate increases. The molar ratio of hydrogen to ethylene in the vapor space is from about 0.00005:1 to about 0.01:1, preferably from about 0.0005:1 to about 0.005:1, in the first reaction zone and from about 0.000001:1 to about 0.003:1, preferably from about 0.000005:1 to about 0.0003:1, in the second reaction zone. Preferably, a higher concentration of hydrogen is used in the first reaction zone to give a first-zone material with a lower molecular weight or higher melt index than the second-zone material. The first-zone material has a melt index of from about 1 to about 300 dg/min, preferably from about 5 to about 200 dg/min, and the final polyethylene produced has melt index of from about 0.10 to about 0.80 dg/min.

A single-site catalyst is used. By "single-site" catalyst, we exclude Ziegler-Natta catalysts and include metallocene catalysts and other systems which comprise an activator and a supported Group 4 to 6 transition metal complex containing at least one polymerization-stable anionic ligand bonded to the transition metal. More preferred complexes include a Group 4 transition metal such as titanium or zirconium.

Suitable activators include alumoxanes, alkyl aluminum compounds, organoboranes, ionic borates, ionic aluminates, aluminoboronates and mixtures thereof. Examples include methylalumoxane (MAO), polymeric MAO (PMAO), ethylalumoxane, diisobutylalumoxane, lithium tetrakis-(pentafluorophenyl) borate, dimethylanilinium tetrakis(pentafluorophenyl)-borate, trityl tetrakis(pentafluorophenyl) borate, tris(pentafluorophenyl)-borane, triphenylborane, tri-n-octylborane, and the like, and mixtures thereof. Aluminoboronates can also be used (see U.S. Pat. No. 6,759,361, the teachings of which are incorporated herein by reference). Preferably, the activator is methylalumoxane. Selection of activator depends on many factors including the organometallic complex used and the desired polymer properties.

The optimum amount of activator needed relative to the amount of complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M. The activator can be combined with the complex and added to the reactor as a mixture, or the components can be added to the reactor separately.

There are many suitable ways to introduce the activator. For example, the activator can be added directly to the polymerization reactor. In one preferred embodiment, a solution of the activator is added to a support material prior to the addition of the organometallic complex. More preferably, the organometallic complex is premixed with a solution of the activator prior to addition to the support material. Preferably, the organometallic complex and activator solution are premixed for a period of time between 1 minute and two hours. When the organometallic complex is premixed with a solution of the activator, optionally a portion of the activator can be premixed and the remainder of the activator added to the reactor.

Preferably, a scavenging amount of an alkylaluminum compound such as triethylaluminum or triisobutylaluminum is also added to at least one of the polymerization reactors. More preferably, the alkylaluminum compound is added to each of the polymerization reactors. Typically, some alkylaluminum compound is added to the reactor prior to the addition of the supported complex, and once the reaction is underway, additional alkylaluminum compound is added to the reactor concurrently with additional supported complex.

Preferably, the single-site catalyst is fed to the first zone and, after transfer of the slurry to the second zone, residual catalyst is suitable to continue the polymerization. Optionally, the single-site catalyst may be added to each of the reaction zones.

The single-site catalyst must be capable of forming high molecular weight polyolefin. Many single-site catalysts catalyze chain termination reactions to an extent that high molecular weight polyolefin cannot be formed. These catalysts are not useful for the process. Other single-site catalysts generate hydrogen. This generated hydrogen interferes with the control of the molecular weight and acts to prevent high molecular weight formation. These catalysts are not useful for the process.

Single-site catalysts capable of forming high molecular weight polyolefins include transition metal complexes that incorporate a bridged indenoindolyl ligand bonded to the transition metal. Suitable indenoindolyl ligands and ways to name, synthesize, and incorporate them into transition metal complexes have been described in considerable detail elsewhere; see, for example U.S. Pat. Nos. 6,838,410, 6,794,468, and 6,232,260, the teachings of which are incorporated herein by reference. Suitable procedures for making the ligands and complexes also appear in PCT Int. Appls. WO 99/24446 and WO 01/53360.

By "bridged indenoindolyl ligand," we mean that the bridged indenoindolyl group can be joined to a second ligand by a divalent linking group. A wide variety of linking groups are suitable for use and are known in the art. The linking group can be a conjugated pi-electron system, but it need not be conjugated. Suitable divalent linking groups include dialkylsilyl, diarylsilyl, alkylboranyl, arylboranyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-dimethylene, polymethylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis(dimethylsilyl), oxybis(dimethylsilyl), and the like. For some additional examples, see *J. Organometal. Chem*. 460 (1993) 191; 518 (1996) 1; 580 (1999) 90.

The divalent linking group can link the indenoindolyl ligand to a polymerization-stable ligand. Suitable polymerization-stable ligands include cyclopentadienyl, indenyl, fluorenyl, boraaryl, indenoindolyl, and the like.

The indene and indole rings can be fused in either an indeno[1,2-b]indolyl or an indeno[2,1-b]indolyl configuration. See U.S. Pat. No. 6,559,251 for an explanation of the distinction.

Bridged indenoindolyl ligands also include those used in open architecture complexes. By "open architecture," we mean a complex having a fixed geometry that enables generation of a highly exposed active site when the complex is combined with an activator. The metal of the complex is pi-bonded to the indenyl Cp ring and is also sigma-bonded through two or more atoms to the indolyl nitrogen or the indenyl methylene carbon. Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon. For examples of "open architecture" complexes and how to make them, see U.S. Pat. Nos. 6,559,251, 6,693,155, and 6,818,713, the teachings of which are incorporated herein by reference.

Additionally, the complex usually includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl).

Indenoindolyl complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked to a cyclopentadienyl group or other polymerization-stable ligand to give a linked ligand precursor. The final step normally involves reaction of the ligand precursor with a transition metal source to give the bridged transition metal complex. The exact synthetic steps and the sequence used will normally depend upon the other ligands used and the transition metal source.

Suitable single-site catalysts capable of forming high molecular weight polyolefins also include transition metal complexes that incorporate one or more aryloxy or arylmercapto ligands bonded to a Group 4 to 6 transition metal. Suitable complexes are described in U.S. Pat. No. 6,323,149, the teachings of which are incorporated herein by reference. Preferred complexes of this type have the structure: $(L)_a(L')_b M(X-A-(R)_d)_c$ wherein M is a Group 4 to 6 transition metal; each L is a substituted or unsubstituted cyclopentadienyl; L' is a substituted or unsubstituted cyclopentadienyl and may be connected to L by a divalent radical selected from the group consisting of hydrocarbyl and heteroatom-containing alkylene radicals, diorganosilyl radicals, diorganogermanium radicals and diorganotin radicals; a and c are non-zero integers; b is 0 or 1; and a+b+c satisfies the valence of M; X is oxygen or sulfur; A is an aromatic ring or a fused aromatic ring; each R is independently selected from the group consisting of hydrogen, halogen, $C_1$-$C_{30}$ hydrocarbyl, trialkylsilyl, a halogenated hydrocarbon radical, a nitrogen containing organic radical, an oxygen containing organic radical and a sulfur containing organic radical; d satisfies the substitution of A.

Any convenient source of the transition metal can be used to make the complex. The transition metal source conveniently has labile ligands such as halide or dialkylamino groups that are easily displaced by indenoindolyl anions. Examples are halides (e.g., $TiCl_4$, $ZrCl_4$), alkoxides, amides, and the like.

The transition metal complex is supported. The support can be any inert material such as polyethylene, magnesium chloride, silica, alumina, titania, or the like. Silica is preferred. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organoaluminum, -magnesium, -silicon, or -boron compounds. See, for example, the techniques described in U.S. Pat. No. 6,211,311, the teachings of which are incorporated herein by reference.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

Typically, linear low density polyethylene is blown into films in machines operating such that the bubble is blown in-the-pocket. By "in-the-pocket," we mean that the polymer exits the die in a way such that the bubble shape is formed as it exits the die. This typically results in a bubble with a lower frostline and typically a lower blow-up ratio than observed with the high-stalk process. The blow-up ratio is the ratio of the diameter of the bubble to the diameter of the die. Preferably, when the polyethylene is blown in-the-pocket, a blow-up ratio of less than 3:1 is used. In a high-stalk process, the polymer exits the die with an original diameter comparable to that of the die. At a point above the die, the polymer relaxes and the bubble expands to a larger diameter. Although less preferred, a high-stalk process can also be used to blow the film. High-stalk generally means that a relatively high blow-up ratio, usually greater than 4:1, and a relatively high frostline height have been employed. High-stalk conditions allow less machine-direction orientation of the polymer. This increases the mechanical strength of the film. Greater dart drop impact strength is obtained when high-stalk conditions are used.

By "dart drop impact strength," we mean the impact resistance of plastic film as measured by ASTM D1709, Method A. A dart is dropped from a height of 66 cm and the impact resistance is derived from the mass of the dart required to break 50% of a large number of specimens.

The following examples merely illustrate the invention. Those skilled in the art will recognize many variations that are within the spirit of the invention and scope of the claims.

EXAMPLE 1

Ethylene-Octene Copolymer

The copolymer is made in a reactor consisting of two reaction zones operating in series. Each reactor is a 100-gallon continuous stirred tank reactor. A fluoroalkyl-substituted aryloxy transition metal complex made as described in U.S. Pat. No. 6,323,149 is supported on silica and combined with methyl alumoxane. The supported complex with methyl alumoxane is fed to a first reactor zone having the polymerization conditions shown in Table 1. Triethylaluminum and an antistatic agent, oleyl bis-(2-hydroxyethyl)amine (available from Akzo Nobel as Armostat® A710), are also introduced into the reaction zone. The feed rates are shown in Table 3. The first reaction zone is designated the "A" reactor. Slurry from the first reactor zone flows into a "flash drum" or low pressure separator where ethylene and hydrogen are separated from the reaction mixture. The remaining slurry of polymer, hexane, and dissolved octene are fed with triethylaluminum and more antistatic agent into the second reaction zone.

The second reaction zone is designated the "B" reactor. The conditions in the second polymerization zone are shown in Table 2. Slurry from the second reactor zone flows into another low pressure separator operating at a pressure of about 10 kPa where ethylene and hydrogen are separated from the reaction mixture. The slurry flows into a centrifuge which separates the polymer powder, and a dryer which evaporates the remaining volatiles leaving a dry polymer powder.

The dry powder is compounded with 1000 ppm (by weight) calcium stearate, 1000 ppm tetrakis[methylene(3,5-di-t-butyl-4-hydroxyhydrocinnamate)]methane (available from Ciba Specialty Chemicals Company as Irganox® 1010), and 1000 ppm tris(2,4-di-(tert)-butylphenyl)phosphite (available from Ciba Specialty Chemicals as Irgafos® 168) in a Farrel continuous mixer at a rotor speed of 340 RPM and a stock discharge temperature of 220° C. The melt is subsequently pelletized in a Farrel extruder connected by a chute to the mixer. The properties of the polymer made in the "A" reactor and the properties of the pelletized product are shown in Table 4. The fraction of product made in the first reaction zone is 45 weight percent. The polymer from the A reactor has a melt index of 10 dg/min and a density of 0.938 g/mL. The pelletized product has a melt index of 0.43 dg/min as measured according to ASTM D1238, Condition 190/2.16 and 19 dg/min as measured according to ASTM D1238, Condition 190/21.6. The density is 0.925 g/mL measured according to ASTM D-1505-96.

The polymer is extruded on a 100 mm Davis-Standard blown film line equipped with a 51 mm diameter barrier screw with a Maddock mixing section. The extruder has four heating zones set at 193° C. for zone 1 and 199° C. for the remaining three zones. The screw speed is set at 41 RPM. Films of 13, 50, and 100 microns are blown in-the-pocket using a blow-up ratio of 2.5 and a frostline height of 25 cm. Total Energy Dart Drop (TEDD) is measured according to ASTM Method D4272. Dart drop impact resistance is measured according to ASTM Method D1709. The film properties are reported in Table 5.

EXAMPLES 2-5

Ethylene-Octene Copolymers

The copolymers are made in a reactor consisting of two reaction zones operating in series in similar fashion as in Example 1. The results are shown in Tables 1-5.

COMPARATIVE EXAMPLES 6-9

Ethylene-Butene Copolymers

The copolymers are made in a reactor consisting of two reaction zones operating in series in similar fashion as in Example 1, but using 1-butene as the comonomer. The results are shown in Tables 1-5.

COMPARATIVE EXAMPLE 10

Two linear low density polyethylene samples (50% by weight GS 707062 having a melt index of 0.7 dg/min and density of 0.918 g/mL and 50% by weight GA 605034 having a melt index of 0.7 dg/min and density of 0.930 g/mL, both available from Equistar Chemicals, LP) are blended to obtain a monomodal polymer with a density of 0.924 g/mL. Properties are shown in Tables 4 and 5.

COMPARATIVE EXAMPLE 11

Two polyethylene samples (25% by weight GS 707062 and 75% by weight GA 605034) are blended to obtain a monomodal polymer with a density of 0.927 g/mL. Properties are shown in Tables 4 and 5.

COMPARATIVE EXAMPLE 12

The process described in U.S. Pat. No. 6,486,270 is followed to obtain an ethylene-butene copolymer with a melt index of 0.057 dg/min and density of 0.938 g/mL. When blown in-the-pocket into a 13 micron film, the film has poor physical properties and a dart drop impact strength less than about 50 grams.

TABLE 1

| | | | Reaction Zone A Conditions | | | | | |
|---|---|---|---|---|---|---|---|---|
| Example | Temp (° C.) | Pressure (psig) | Ethylene Feed (lbs/hr) | Comonomer Feed (lb/hr) | Hexane Feed (lbs/hr) | $H_2/C2$ (molar ratio) | PE Production Rate (lbs/hr) | Residence Time (hr) |
| 1 | 71 | 38 | 23 | 4.1 | 147 | 0.0038 | 21 | 3.1 |
| 2 | 71 | 48 | 25 | 6.4 | 157 | 0.0050 | 23 | 2.9 |
| 3 | 71 | 42 | 23 | 4.1 | 141 | 0.0037 | 21 | 3.2 |
| 4 | 71 | 59 | 27 | 7.6 | 143 | 0.0062 | 25 | 3.1 |
| 5 | 71 | 58 | 28 | 8.8 | 170 | 0.0063 | 25 | 2.7 |

TABLE 1-continued

Reaction Zone A Conditions

| Example | Temp (° C.) | Pressure (psig) | Ethylene Feed (lbs/hr) | Comonomer Feed (lb/hr) | Hexane Feed (lbs/hr) | H$_2$/C2 (molar ratio) | PE Production Rate (lbs/hr) | Residence Time (hr) |
|---|---|---|---|---|---|---|---|---|
| C6 | 71 | 62 | 25 | 1.0 | 163 | 0.0047 | 21 | 2.8 |
| C7 | 71 | 59 | 25 | 2.4 | 162 | 0.0057 | 22 | 2.8 |
| C8 | 77 | 26 | 23 | 0.3 | 91 | 0.0066 | 22 | 4.6 |
| C9 | 77 | 32 | 23 | 0.4 | 90 | 0.0062 | 22 | 4.6 |

TABLE 2

Reaction Zone B Conditions

| Example | Temp. (C.) | Pressure (psig) | Ethylene Feed (lbs/hr) | Comonomer Feed (lbs/hr) | Hexane Feed (lbs/hr) | H$_2$/C2 (molar ratio) | PE Production Rate (lbs/hr) | Residence Time (hr) |
|---|---|---|---|---|---|---|---|---|
| 1 | 77 | 94 | 30 | 38 | 68 | 0.0011 | 25 | 2.0 |
| 2 | 77 | 72 | 27 | 35 | 65 | 0.00065 | 23 | 2.0 |
| 3 | 77 | 42 | 29 | 40 | 81 | 0.00057 | 28 | 1.9 |
| 4 | 76 | 81 | 23 | 40 | 57 | 0.00041 | 19 | 2.2 |
| 5 | 77 | 66 | 23 | 29 | 57 | 0.00061 | 20 | 1.9 |
| C6 | 76 | 95 | 24 | 29 | 75 | 0.00045 | 21 | 1.9 |
| C7 | 76 | 76 | 24 | 19 | 79 | 0.00043 | 21 | 1.8 |
| C8 | 71 | 109 | 36 | 5.5 | 220 | 0.00050 | 26 | 1.5 |
| C9 | 71 | 117 | 36 | 6.3 | 220 | 0.00058 | 24 | 1.5 |

TABLE 3

Feed Rates

| Example | "A" Reactor Supported Complex/MAO Flow (g/hr) | "A" Reactor Triethylaluminum Flow (g/hr) | "A" Reactor A710 Flow (g/hr) | "B" Reactor Triethylaluminum Flow (g/hr) | "B" Reactor A710 Flow (g/hr) |
|---|---|---|---|---|---|
| 1 | 27 | 1.9 | 0.23 | 9.5 | 1.0 |
| 2 | 25 | 1.8 | 0.22 | 9.6 | 1.1 |
| 3 | 24 | 1.8 | 0.23 | 9.3 | 1.0 |
| 4 | 21 | 1.6 | 0.22 | 9.9 | 1.0 |
| 5 | 27 | 2.3 | 0.36 | 9.7 | 0.90 |
| C6 | 24 | 1.6 | 0.22 | 9.5 | 1.0 |
| C7 | 23 | 1.7 | 0.23 | 9.7 | 1.1 |
| C8 | 25 | 0 | 0.32 | 13.5 | 0.61 |
| C9 | 28 | 0 | 0.17 | 7.2 | 0.53 |

TABLE 4

Polymer Properties

| Example | Final MI (dg/min) | Final MI$_{20}$ (dg/min) | Final Density (g/mL) | Wt % from A Reactor | A reactor MI (dg/min) | A reactor Density (g/mL) |
|---|---|---|---|---|---|---|
| 1 | 0.43 | 19 | 0.925 | 45 | 10 | 0.938 |
| 2 | 0.20 | 15 | 0.924 | 50 | 24 | 0.939 |
| 3 | 0.11 | 7.5 | 0.923 | 45 | 9.5 | 0.939 |
| 4 | 0.17 | 22 | 0.925 | 55 | 51 | 0.942 |
| 5 | 0.51 | 35 | 0.926 | 54 | 48 | 0.939 |
| C6 | 0.30 | 23 | 0.925 | 50 | 47 | 0.949 |
| C7 | 0.24 | 21 | 0.926 | 50 | 49 | 0.941 |
| C8 | 0.11 | 9.6 | 0.938 | 48 | 125 | 0.954 |
| C9 | 0.11 | 11 | 0.939 | 48 | 140 | 0.954 |
| C10 | 0.7 | — | 0.924 | — | — | — |
| C11 | 0.7 | — | 0.927 | — | — | — |

TABLE 5

Film Properties

| Polymer Example Number | Film thickness (microns) | TEDD (ft-lbs) | Dart Drop (g) |
|---|---|---|---|
| 1 | 13 | 0.75 | 225 |
| 2 | 13 | 0.55 | 145 |
| 3 | 13 | 1.4 | 250 |
| 4 | 13 | 1.0 | 186 |
| 5 | 13 | 0.49 | 147 |
| C6 | 13 | 0.29 | <50 |
| C7 | 13 | 0.30 | <50 |
| 1 | 50 | 4.3 | 880 |
| 2 | 50 | >6.5 | 1320 |
| 3 | 50 | >6.5 | >1950 |
| 4 | 50 | >6.5 | >1950 |
| 5 | 50 | 4.8 | 760 |
| C6 | 50 | 1.9 | 231 |
| C7 | 50 | 1.7 | 198 |
| 1 | 100 | >6.5 | 1100 |
| 2 | 100 | >6.5 | >1950 |
| 3 | 100 | >6.5 | >1950 |
| 4 | 100 | >6.5 | >1950 |
| 5 | 100 | >6.5 | 1260 |
| C6 | 100 | 3.6 | 541 |
| C7 | 100 | 3.5 | 487 |
| C10 | 100 | 2.9 | 363 |
| C11 | 100 | 2.9 | 390 |

Table 5 shows the results for films blown in-the-pocket. Superior film properties are achieved for polymers made by the process of the invention.

The preceding examples are meant only as illustrations. The following claims define the invention.

We claim:

1. A process which comprises polymerizing ethylene with a $C_6$-$C_{10}$ alpha-olefin in two slurry reaction zones in the presence of a single-site catalyst system comprising an activator and a supported Group 4-6 transition metal complex to produce polyethylene, wherein from about 35 to about 75 wt. % of the polyethylene is produced in a first reaction zone with a hydrogen to ethylene molar ratio in the vapor phase of from about 0.00005:1 to about 0.01:1 to produce a first-zone material having a melt index of from about 1 to about 300 dg/min which is transferred as a slurry to a second reaction zone having a hydrogen to ethylene molar ratio in the vapor phase of from about 0.000001:1 to about 0.003:1 to produce polyethylene with a bimodal molecular weight distribution, a density of from about 0.91 to about 0.94 g/cm$^3$, and a melt index of from about 0.10 to about 0.80 dg/min, wherein each of said melt indices is measured according to ASTM D1238, Condition 190/2.16.

2. The process of claim 1 wherein the polyethylene, when blown in-the-pocket into a film having a thickness of 13 microns, has a dart drop impact strength of greater than about 100 grams.

3. The process of claim 2 wherein the dart drop impact strength is greater than about 140 grams.

4. The process of claim 1 wherein the $C_6$-$C_{10}$ α-olefin is 1-octene.

5. The process of claim 1 wherein greater than 50% by weight of the total $C_6$-$C_{10}$ α-olefin is added to the second reaction zone.

6. The process of claim 5 wherein greater than 80% by weight of the total $C_6$-$C_{10}$ α-olefin is added to the second reaction zone and the $C_6$-$C_{10}$ α-olefin is 1-octene.

7. The process of claim 5 wherein each zone is operated at a temperature of from about 60° C. to about 100° C.

8. The process of claim 1 wherein the polyethylene has a density of from about 0.915 to about 0.925 g/cm$^3$.

9. The process of claim 8 wherein the polyethylene has a density of from 0.920 to 0.925 g/cm$^3$.

10. The process of claim 1 wherein the transition metal complex contains at least one bridged indenylindolyl ligand.

11. The process of claim 1 wherein the transition metal complex incorporates a Group 4 transition metal and at least one aryloxy ligand.

* * * * *